(12) United States Patent
Kurizoe et al.

(10) Patent No.: US 12,215,235 B2
(45) Date of Patent: Feb. 4, 2025

(54) COMPOSITE MEMBER

(71) Applicant: Panasonic Intellectual Property Management Co., Ltd., Osaka (JP)

(72) Inventors: Naoki Kurizoe, Osaka (JP); Natsuki Sato, Osaka (JP); Tatsuro Yoshioka, Osaka (JP); Ryosuke Sawa, Osaka (JP); Koki Iwata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 218 days.

(21) Appl. No.: 18/016,416

(22) PCT Filed: Jul. 2, 2021

(86) PCT No.: PCT/JP2021/025157
§ 371 (c)(1),
(2) Date: Jan. 16, 2023

(87) PCT Pub. No.: WO2022/019092
PCT Pub. Date: Jan. 27, 2022

(65) Prior Publication Data
US 2023/0272222 A1 Aug. 31, 2023

(30) Foreign Application Priority Data
Jul. 22, 2020 (JP) .................. 2020-125102

(51) Int. Cl.
*C09D 1/00* (2006.01)
*B32B 5/16* (2006.01)
(Continued)

(52) U.S. Cl.
CPC .................. *C09D 1/00* (2013.01); *B32B 5/16* (2013.01); *B32B 27/14* (2013.01); *C08K 3/22* (2013.01);
(Continued)

(58) Field of Classification Search
CPC .......... B32B 2264/10; B32B 2264/102; B32B 2264/1021; B32B 2264/1023;
(Continued)

(56) References Cited

U.S. PATENT DOCUMENTS

2014/0186616 A1   7/2014  Na et al.
2018/0148609 A1   5/2018  Ono
(Continued)

FOREIGN PATENT DOCUMENTS

CN   107615103 A    1/2018
JP   2008-208247 A  9/2008
(Continued)

OTHER PUBLICATIONS

International Search Report for corresponding Application No. PCT/JP2021/025157, mailed Sep. 21, 2021.
(Continued)

*Primary Examiner* — Hai Vo
(74) *Attorney, Agent, or Firm* — Renner, Otto, Boisselle & Sklar, LLP

(57) ABSTRACT

Provided is a composite member, including: an inorganic layer that contains an inorganic substance containing at least one of a metal oxide or a metal oxide hydroxide. The composite member includes a resin layer that is provided on a surface of the inorganic layer and contains a resin and inorganic particles that are dispersed in the resin and some of which adhere directly to the inorganic substance of the inorganic layer. A porosity in a cross section of the inorganic layer is 20% or less, and a peak derived from a hydroxyl group is detected for the inorganic layer when measurement is performed using infrared spectroscopy or X-ray diffraction.

7 Claims, 13 Drawing Sheets

(51) Int. Cl.
  *B32B 27/14* (2006.01)
  *C08K 3/22* (2006.01)
  *C08K 3/36* (2006.01)
(52) U.S. Cl.
  CPC ............ *C08K 3/36* (2013.01); *B32B 2250/02* (2013.01); *B32B 2264/10* (2013.01); *B32B 2264/102* (2013.01); *B32B 2305/026* (2013.01); *C08K 2003/2227* (2013.01)
(58) Field of Classification Search
  CPC . B32B 2264/1025; B32B 27/06; B32B 27/14; B32B 27/18; B32B 27/20; B32B 27/308; B32B 37/24; B32B 5/16; B32B 9/005; B32B 9/045; C08K 2003/2227; C08K 3/22; C08K 3/36; C09D 1/00
  See application file for complete search history.

(56) References Cited

U.S. PATENT DOCUMENTS

2020/0186685 A1* 6/2020 Watanabe ................ G02B 1/14
2023/0066443 A1* 3/2023 Kim .................... H01M 50/403

FOREIGN PATENT DOCUMENTS

| JP | 2014-128975 A | 7/2014 |
| JP | 2014-156052 A | 8/2014 |
| JP | 2020-095254 A | 6/2020 |

OTHER PUBLICATIONS

Written Opinion for corresponding Application No. PCT/JP2021/025157, mailed Sep. 21, 2021.

* cited by examiner

COMPOSITE MEMBER

TECHNICAL FIELD

The present invention relates to a composite member.

BACKGROUND ART

Composite members made by bonding ceramic and plastic together through an adhesive have been known. However, even when a liquid adhesive is applied to ceramic or plastic and then a predetermined degree of pressure is applied to bond the ceramic and plastic through the adhesive, it is difficult to obtain sufficient joining strength.

Patent Literature 1 discloses a method in which a liquid adhesive is solidified on the surface of ceramic to form an adhesive layer thereon and a molten resin is applied to the ceramic whose surface is covered with the adhesive layer. This method produces a composite having the adhesive layer interposed between ceramic and plastic.

CITATION LIST

Patent Literature

Patent literature 1: Japanese Unexamined Patent Application Publication No. 2014-128975

SUMMARY OF THE INVENTION

In the related art, liquid adhesives mainly containing polyvinyl acetate, polyvinyl alcohol, polybutylene terephthalate, dibutyl acetate, and an organic solvent are used as adhesives. However, even when such adhesives are used, if the adhesive layer deteriorates, the ceramic and plastic may separate from each other.

The present invention has been made in consideration of the above-described issue, which is inherent in the related art. An object of the present invention is to provide a composite member in which an inorganic layer and a resin layer are firmly joined together with no adhesive interposed therebetween.

In response to the above issue, a composite member according to one aspect of the present invention includes an inorganic layer that contains an inorganic substance containing at least one of a metal oxide or a metal oxide hydroxide. The composite member includes a resin layer that is provided on a surface of the inorganic layer and contains a resin and inorganic particles that are dispersed in the resin and some of which adhere directly to the inorganic substance of the inorganic layer. A porosity in a cross section of the inorganic layer is 20% or less, and a peak derived from a hydroxyl group is detected for the inorganic layer when measurement is performed using infrared spectroscopy or X-ray diffraction.

DESCRIPTION OF EMBODIMENTS

Figure 1:
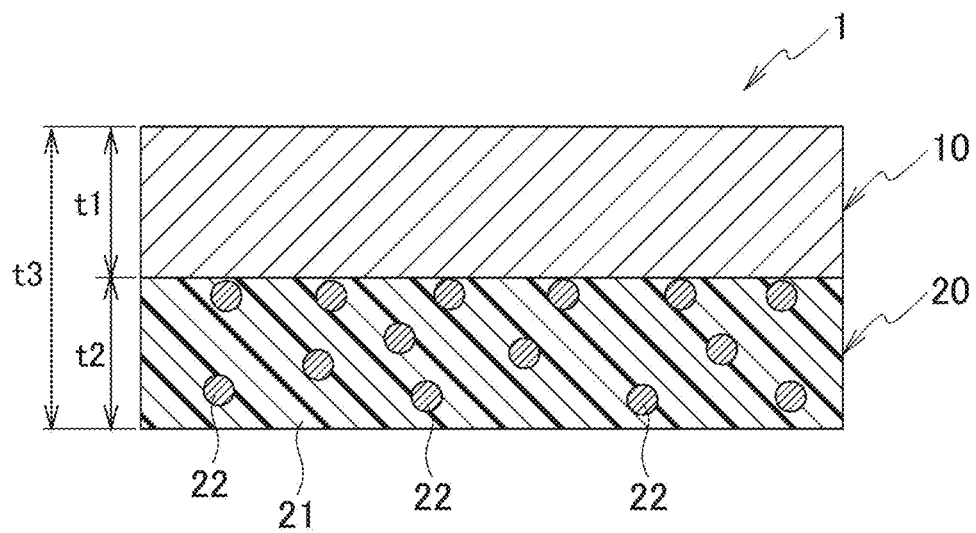
FIG. 1 is a schematic diagram illustrating an example of a composite member according to the present embodiment.
Figure 2:
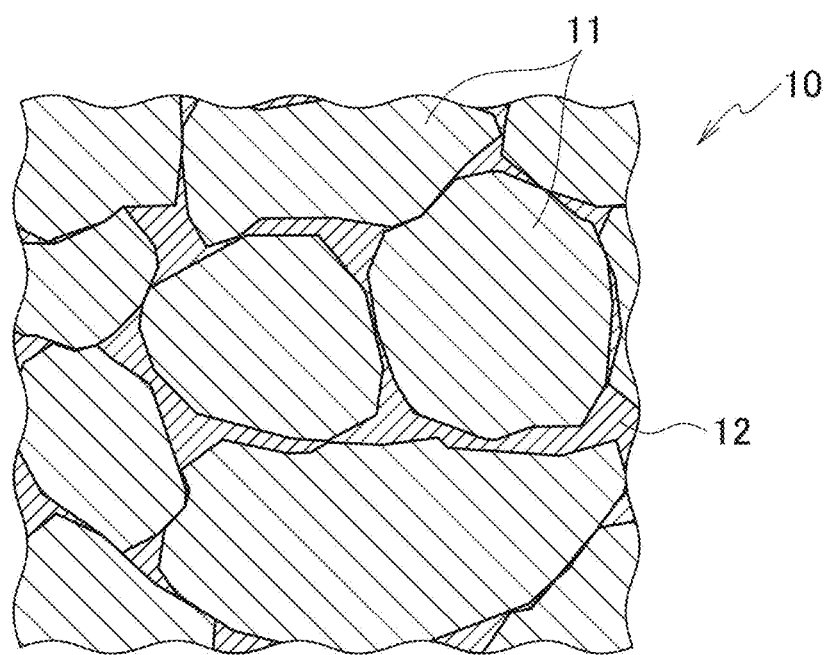
FIG. 2 is a schematic cross-sectional view of an example of an inorganic layer according to the present embodiment.

A composite member and a method of producing the composite member according to the present embodiment are described in detail below using drawings. Note that dimensional ratios in the drawings are exaggerated for convenience of explanation and may differ from the actual ratios.

[Composite Member]

As illustrated in FIG. 1, a composite member 1 according to the present embodiment includes an inorganic layer 10 and a resin layer 20. The resin layer 20 is provided on the surface of the inorganic layer 10, The resin layer 20 may be provided on only one side or both sides of the inorganic layer 10.

(Inorganic Layer 10)

The inorganic layer 10 according to the present embodiment may include multiple particles 11, as illustrated in FIG.

2, for example. The inorganic layer 10 may be formed by binding the particles 11 made from an inorganic substance to each other.

The inorganic layer 10 may include a binding part 12 that binds the multiple particles 11 to each other. The inorganic layer 10 may have part in which some of the multiple particles 11 are directly bound to each other without having the binding part 12 interposed therebetween. The binding part 12 may cover part or all of the surface of each of the multiple particles 11.

The inorganic layer 10 contains an inorganic substance. The inorganic substance may be contained in at least one of the multiple particles 11 or the binding part 12. That is, the inorganic substance may be contained in either one of the multiple particles 11 or the binding part 12, or in both of the multiple particles 11 and the binding part 12.

The inorganic substance contained the inorganic layer 10 contains at least one of a metal oxide or a metal oxide hydroxide. That is, the inorganic substance may contain either one of the metal oxide or the metal oxide hydroxide, or may contain both of the metal oxide and the metal oxide hydroxide. The metal oxide is preferably a compound in which only oxygen is bound to a metallic element.

Preferably, at least one of the metal oxide or the metal oxide hydroxide contains at least one metallic element selected from the group consisting of an alkali metal, an alkaline earth metal, a transition metal, a base metal, and a semimetal. In this description, the alkaline earth metal includes beryllium and magnesium in addition to calcium, strontium, barium, and radium. The base metal includes aluminum, zinc, gallium, cadmium, indium, tin, mercury, thallium, lead, bismuth, and polonium. The semimetal includes boron, silicon, germanium, arsenic, antimony, and tellurium. Among them, the inorganic substance preferably contains at least one metallic element selected from the group consisting of zinc, aluminum, and magnesium. It is possible for the inorganic substance containing at least one of the metal to easily form the binding part 12 derived from the inorganic substance using a pressure heating method as described below.

The metal oxide may contain at least one selected from the group consisting of zinc oxide, magnesium oxide, and a complex of zinc oxide and magnesium oxide, Such a metal oxide can provide the inorganic layer 10 having high durability.

The metal oxide hydroxide may contain an aluminum oxide hydroxide, for example. An example of the aluminum oxide hydroxide is boehmite represented by the composition formula of AlOOH. Boehmite has high chemical stability because it is insoluble in water and hardly reacts with acids and alkalis at room temperature. Boehmite also has excellent heat resistance due to its high dehydration temperature of around 500° C. Since boehmite has the specific gravity of about 3.07, when the inorganic layer 10 contains boehmite, it is possible to provide the inorganic layer 10 being lightweight and having excellent chemical stability.

When the inorganic substance contained in the inorganic layer 10 is boehmite, the particles 11 may contain only a boehmite phase, or may contain a mixed phase of boehmite and an aluminum oxide or an aluminum hydroxide other than boehmite. For example, the particles 11 may be a mixture of a phase containing boehmite and a phase containing gibbsite ($Al(OH)_3$). Adjacent particles 11 are preferably bound through at least one of an aluminum oxide or an aluminum oxide hydroxide. That is, the particles 11 are preferably not bound through an organic binder containing an organic compound and are not also bound through an inorganic binder containing an inorganic substance other than an aluminum oxide and an aluminum oxide hydroxide. Note that when adjacent particles 11 are bound through at least one of an aluminum oxide or an aluminum oxide hydroxide, the aluminum oxide and the aluminum oxide hydroxide may be crystalline or amorphous.

When the inorganic layer 10 contains boehmite, the proportion of the boehmite phase is preferably 50 mass % or more, more preferably 60 mass % or more, even more preferably 70 mass % or more. Increasing the proportion of the boehmite phase makes it possible to obtain the inorganic layer 10 being lightweight and having excellent chemical stability and excellent heat resistance. Note that the proportion of the boehmite phase in the inorganic layer 10 can be obtained by measuring an X-ray diffraction pattern of the inorganic layer 10 using an X-ray diffraction method and then performing Rietveld analysis.

When the inorganic substance contained in the inorganic layer 10 is boehmite, the binding part 12 may contain a boehmite phase. When the binding part 12 contains a boehmite phase, the multiple particles 11 may contain aluminum nitride, Aluminum nitride has high electrical resistance and high dielectric strength, and also has very high thermal conductivity as a ceramic material. The multiple particles 11 may not be bound through an organic binder containing an organic compound and may not be also bound through an inorganic binder other than the boehmite phase. As is described below, the inorganic layer 10 can be formed by heating a mixture of an inorganic substance powder and water under pressure, and it is not necessary to use a reaction accelerator. Thus, it is possible for the inorganic layer 10 to retain the original properties of aluminum nitride and boehmite because there are no impurities derived from organic and inorganic binders and from reaction accelerators.

It is more preferable that the inorganic substance contains at least one of an oxide or an oxide hydroxide of the above-described at least one metallic element as a main component. That is, the inorganic substance preferably contains 50 mol % or more, more preferably 80 mol % or more, of at least one of an oxide or an oxide hydroxide of the above-described at least one metallic element. The inorganic layer 10 preferably also contains at least one of an oxide or an oxide hydroxide as a main component. That is, the inorganic layer 10 preferably contains 50 mol % or more, more preferably 80 mol % or more, of at least one of an oxide or an oxide hydroxide.

The inorganic substance contained in the inorganic layer 10 is preferably polycrystalline. When the inorganic substance contained in the inorganic layer 10 is polycrystalline, it is possible to obtain the inorganic layer 10 having higher durability compared with a case where the inorganic substance is amorphous. The particles 11 made from an inorganic substance may be crystalline, and the inorganic layer 10 may be formed by an aggregation of many particles 11. Note that the inorganic substance particles 11 are more preferably crystalline particles containing at least one metallic element selected from the group consisting of an alkali metal, an alkaline earth metal, a transition metal, a base metal, and a semimetal. The particles 11 of an inorganic substance are preferably crystalline particles containing at least one of an oxide or an oxide hydroxide of the above-described at least one metallic element. The inorganic substance particles 11 are more preferably crystalline particles containing at least one of an oxide or an oxide hydroxide of the above-described at least one metallic element as a main component.

The inorganic substance contained in the inorganic layer 10 preferably contains no hydrate of calcium compounds. The calcium compounds here are tricalcium silicate (alite, $3CaO \cdot SiO_2$), dicalcium silicate (belite, $2CaO \cdot SiO_2$), calcium aluminate ($3CaO \cdot Al_2O_3$), calcium aluminoferrite ($4CaO \cdot Al_2O_3 \cdot Fe_2O_3$), and calcium sulfate ($CaSO_4 \cdot 2H_2O$). When the inorganic substance contained in the inorganic layer 10 contains a hydrate of any of the above-described calcium compounds, the porosity in the cross section of the inorganic layer 10 may exceed 20%, which may decrease the strength thereof. Thus, the inorganic substance preferably contains no hydrate of any of the above-described calcium compounds. The inorganic substance contained in the inorganic layer 10 also preferably contains no phosphate cement, zinc phosphate cement, and calcium phosphate cement. When the inorganic substance does not contain the above-described cement, the porosity in the cross section of the inorganic layer 10 decreases, which makes it possible to enhance the mechanical strength thereof.

The average particle size of the multiple particles 11 is not limited. The average particle size of the particles 11 is preferably 300 nm or more and 50 µm or less, more preferably 300 nm or more and 30 µm or less, even more preferably 300 nm or more and 20 µm or less. When the average particle size of the inorganic substance particles 11 is within the above-described ranges, the particles 11 are bound strongly to each other, which makes it possible to enhance the strength of the inorganic layer 10. Note that as for the value of the "average particle size" in this description, unless otherwise noted, a value is adopted that is calculated as an average size of the particles observed in several to several tens of visual fields using observation means such as a scanning electron microscope (SEM) or a transmission electron microscope (TEM).

The shape of the inorganic substance particles 11 is not limited but can be spherical, for example. The particles 11 may have a whisker shape (needle shape) or a scale shape. Particles having a whisker shape or a scale shape have a higher degree of contact with other particles compared to the particles having a spherical shape, which makes it easy to enhance the strength of the inorganic layer 10. Thus, by using particles having such a shape as the particles 11, it becomes possible to enhance the strength of the entire inorganic layer 10.

Here, it is preferable that the inorganic substance contained in the inorganic layer 10 contains substantially no hydrate. In this description, "the inorganic substance contains substantially no hydrate" means that the inorganic substance is not made to contain a hydrate on purpose. Thus, when a hydrate is mixed with the inorganic substance as an unavoidable impurity, the condition in which "the inorganic substance contains substantially no hydrate" is satisfied. Note that since boehmite is a metal oxide hydroxide, it is not included in hydrates in this specification.

The inorganic layer 10 is preferably made from a group of particles of an inorganic substance. That is, the inorganic layer 10 is made from the multiple particles 11 containing an inorganic substance, and it is preferable that the inorganic layer 10 be formed by the inorganic substance particles 11 bound to each other. Here, the particles 11 may be in point contact with each other or in surface contact in which particle surfaces of the particles 11 contact each other.

The binding part 12 preferably contains an inorganic compound that is amorphous. Specifically, the binding part 12 may be a part containing only the amorphous inorganic compound or a part of a mixture of the amorphous inorganic compound and a crystalline inorganic compound. The binding part 12 may be a part where the crystalline inorganic compound is dispersed inside the amorphous inorganic compound. When an amorphous inorganic compound and a crystalline inorganic compound are mixed, the amorphous inorganic compound and the crystalline inorganic compound may have the same chemical composition or different chemical compositions from each other.

It is preferable that the inorganic substance particles 11 and the binding part 12 contain the same metallic element and the metallic demerit be at least one selected from the group consisting of an alkali metal, an alkaline earth metal, a transition metal, a base metal, and a semimetal. That is, it is preferable that the inorganic substance contained in the particles 11 and the amorphous inorganic substance contained in the binding part 12 contain at least the same metallic element. The inorganic substance contained in the particles 11 and the amorphous Inorganic substance contained in the binding part 12 may have the same chemical composition or different chemical compositions from each other. Specifically, when the metallic element is zinc, the inorganic substance contained in the particles 11 and the amorphous inorganic substance contained in the binding part 12 may both be zinc oxide (ZnO). It is also possible that the inorganic substance contained in the particles 11 is ZnO and the amorphous inorganic substance contained in the binding part 12 is a zinc-containing oxide other than ZnO.

A metal oxide contained in both the particles 11 and the binding part 12 is preferably at least one selected from the group consisting of zinc oxide, magnesium oxide, and a complex of zinc oxide and magnesium oxide. As described below, using at least one of these metal oxides makes it possible to form the binding part 12 in a simple manner.

The porosity in the cross section of the inorganic layer 10 is 20% or less. That is, when the cross section of the inorganic layer 10 is observed, the average value of the percentage of pores per unit area is 20% or less. When the porosity is 20% or less, the occurrence of cracks starting from pores in the inorganic layer 10 is prevented, and thus it is possible to enhance the bending strength of the composite member 1. Note that the porosity in the cross section of the inorganic layer 10 is preferably 15% or less, more preferably 10% or less, even more preferably 5% or less. The smaller the porosity in the cross section of the inorganic layer 10, the more the cracks starting from pores is prevented, and thus it is possible to enhance the strength of the composite member 1.

In this description, the porosity can be determined as follows. First, a cross section of the inorganic layer 10 is observed to discriminate between pores and non-pores. Then, the unit area and the area of the pores in that unit area are measured to obtain the percentage of pores per unit area. After obtaining the above-described percentage of pores per unit area at multiple points, the average value of the percentage of pores per unit area is defined as the porosity. Note that when a cross section of the inorganic layer 10 is observed, an optical microscope, a scanning electron microscope (SEM), and a transmission electron microscope (TEM) are usable. The unit area and the area of the pores in that unit area may be measured through binarizing an image observed using a microscope.

The size of pores present inside the inorganic layer 10 is not limited but is preferably as small as possible. When the size of pores is small, cracks starting from the pores are prevented, which makes it possible to enhance the strength of the inorganic layer 10 and to improve the machinability of the inorganic layer 10. Note that the pore size of the inorganic layer 10 is preferably 5 µm or less, more preferably 1 µm or less, even more preferably 100 nm or less. The size of pores existing inside the inorganic layer 10 can be determined by observing a cross section of the inorganic layer 10 using a microscope in the same manner as the above-described porosity.

In the composite member 1, a peak derived from a hydroxyl group is detected for the inorganic layer 10 when measurement is performed using infrared spectroscopy or X-ray diffraction. Specifically, it can be determined that the above-described peak is detected for the inorganic layer 10 when a peak area of the peak is larger than a background level. The peak area depends on the type of material making up the inorganic layer 10 but can be calculated using a method performed in examples described below. When the infrared spectroscopy is used for measurement, the peak area may be 2 $cm^{-1}$ or more or 3 $cm^{-1}$ or more. When the X-ray diffraction method is used for measurement, the peak area may be 1000° (2θ)·cps or more, 2000 (2θ)·cps car more, or 4000° (2θ)·cps or more.

Since a hydroxyl group is desorbed when the inorganic layer 10 is heated at a high temperature, it is necessary to heat the inorganic layer 10 at a low temperature for the above-described peak to be detected in the inorganic layer 10. The inorganic layer 10 can be obtained by pressurizing the raw material while heating at a low temperature, such as 50 to 300° C., as described below, and thus the peak derived from a hydroxyl group is detected, Since the inorganic layer 10 can be obtained by pressurizing while heating at a low temperature, a member having low heat resistance can be added to the inorganic layer 10, for example. Organic matter, such as resin particles and coloring matter, can be added to the inorganic layer 10, for example.

A thickness t1 of the inorganic layer 10 is not limited but can be set to 50 µm or more, for example. The composite member 1 according to the present embodiment is formed using a pressure heating method as described below, and it is possible to easily obtain the inorganic layer 10 having a large thickness. Note that the thickness t1 of the inorganic layer 10 can be set to 1 mm or more or 1 cm or more, There is no particular upper limit for the thickness t1 of the inorganic layer 10, but the thickness t1 can be set to 50 cm, for example.

(Resin Layer 20)

The resin layer 20 contains a resin 21 and inorganic particles 22 as illustrated in FIG. 1. The inorganic particles 22 are dispersed in the resin 21. Thus, the resin 21 covers at least part of the surface of each of the inorganic particles 22, The resin 21 may cover only part of the surface of each of the inorganic particles 22 or the entire surface of each of the inorganic particles 22.

Figure 3:
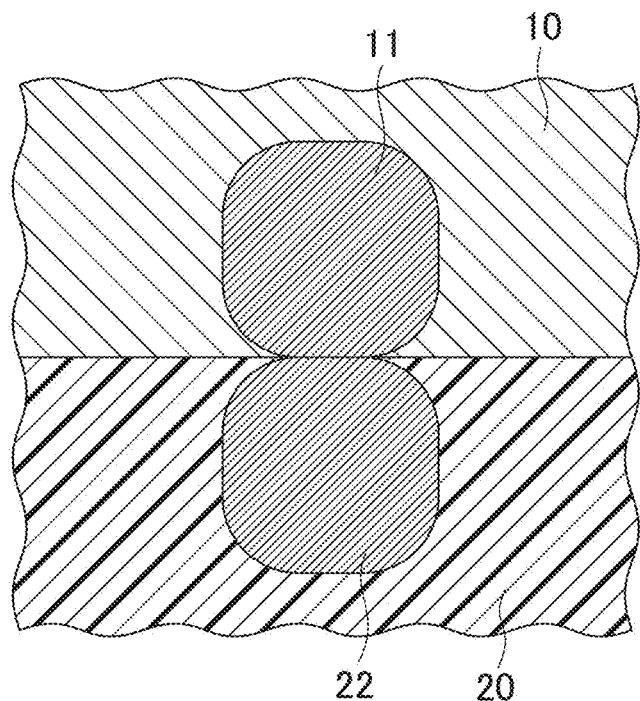
FIG. 3 is a cross-sectional view of direct adhesion of an inorganic substance in the inorganic layer and an inorganic particle in a resin layer.

As illustrated in FIG. 3, an inorganic particle 22 adheres directly to the inorganic substance of the inorganic layer 10. The direct adhesion of the inorganic particle 22 to the inorganic substance of the inorganic layer 10 enhances the adhesive strength between the inorganic layer 10 and the resin layer 20, which makes it possible to prevent separation of the inorganic layer 10 and the resin layer 20 from each other. Note that adhesion in the present embodiment means that some of the inorganic particles 22 and the inorganic layer 10 are in contact with each other, and that the inorganic particles 22 contribute to improving the adhesive strength between the inorganic layer 10 and the resin layer 20. Thus, adhesion in the present embodiment means that some inorganic particles 22 and the inorganic layer 10 are in contact but the inorganic particles 22 and the inorganic substance contained in the inorganic layer 10 are not bound to each other in a continuous and integral manner.

Figure 4:
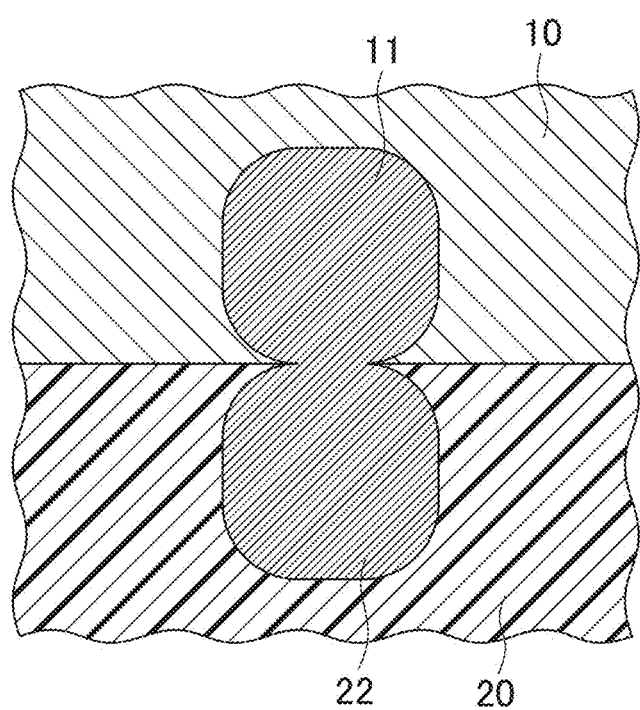
FIG. 4 is a cross-sectional view of continuous and integral binding of an inorganic substance in the inorganic layer and an inorganic particle in the resin layer.

Note that as illustrated in FIG. 4, it is preferable that some inorganic particles 22 and the inorganic substance contained in the inorganic layer 10 be connected in a continuous and integral manner. When some inorganic particles 22 and the inorganic substance contained in the inorganic layer 10 are bound to each other in this way, the inorganic layer 10 and the resin layer 20 are tightly bound to each other through the inorganic substance and the inorganic particles 22. Thus, the adhesive strength between the inorganic layer 10 and the resin layer 20 is improved, which makes it possible to further prevent separation of the inorganic layer 10 and the resin layer 20 from each other.

The resin 21 may be a thermosetting resin or a thermoplastic resin. The thermoplastic resin preferably includes at least one resin selected from the group consisting of a polyacrylate, an ethylene-vinyl acetate copolymer, an olefin-based resin, a polyvinyl butyral, a polyethylene terephthalate, and polyimide, for example. The thermosetting resin preferably includes at least one resin selected from the group consisting of a polyacrylate, an epoxy resin, polyurethane, and polyimide, for example.

The inorganic particles 22 contain an inorganic substance, for example. The inorganic substance contained in the inorganic particles 22 may contain at least one of a metal oxide or a metal oxide hydroxide. That is, the inorganic substance may contain either one of the metal oxide and the metal oxide hydroxide, or may contain both of the metal oxide and the metal oxide hydroxide. The metal oxide is preferably a compound in which only oxygen is bound to a metallic element. At least one of the metal oxide or the metal oxide hydroxide preferably contains at least one metallic element selected from the group consisting of an alkali metal, an alkaline earth metal, a transition metal, a base metal, and a semimetal.

The inorganic particles 22 preferably contain a metallic element contained in the inorganic substance of the inorganic layer 10. When the inorganic substance contained in the inorganic layer 10 and the inorganic particles 22 contained in the resin layer 20 contain the same kind of metallic elements, the reactivity between the inorganic substance in the inorganic layer 10 and the inorganic particles 22 is enhanced. Thus, the binding between the inorganic substance of the inorganic layer 10 and the inorganic particles 22 becomes stronger, and thus it is possible to further improve the close adhesion between the inorganic layer 10 and the resin layer 20. The inorganic substance in the inorganic layer 10 and the inorganic substance contained in the inorganic particles 22 may have the same chemical composition or different chemical compositions. Specifically, when the metallic element is zinc, the inorganic substance in the inorganic layer 10 and the inorganic substance contained in the inorganic particles 22 may both be a zinc oxide (ZnO). It is also possible that the inorganic substance in the inorganic layer 10 is ZnO and the inorganic substance contained in the inorganic particles 22 is a zinc-containing oxide other than ZnO.

The inorganic particles 22 preferably have a hydroxyl group. The inorganic particles 22 may contain an oxide such as silica and alumina, and a hydroxide such as aluminum hydroxide, for example. When the inorganic particles 22 have a hydroxyl group, the inorganic particles 22 and the inorganic substance in the inorganic layer 10 are tightly bound to each other through a hydrogen bond. Thus, it is possible to further improve the close adhesion between the inorganic layer 10 and the resin layer 20. Note that whether the inorganic particles 22 have a hydroxyl group or not can be determined through measurement using infrared spectroscopy or X-ray diffraction as described above.

The average particle size of the inorganic particles 22 is not limited. The average particle size of the inorganic particles 22 is preferably 300 nm or more and 50 μm or less, more preferably 300 nm or more and 30 μm or less, even more preferably 300 nm or more and 20 μm or less. When the average particle size of the inorganic particles 22 is within the above-described ranges, it is possible to enhance the adhesive strength between the inorganic layer 10 and the resin layer 20 without greatly impairing the mechanical strength of the resin layer 20.

The shape of the inorganic particles 22 is not limited but can be spherical, for example. The inorganic particles 22 may have a whisker shape (needle shape) or a scale shape.

The percentage of the inorganic particles 22 in the resin layer 20 is preferably 10 vol. % or more and 70 vol % or less. When the percentage of the inorganic particles 22 is 10 vol % or more, the adhesion area between the inorganic substance contained in the inorganic layer 10 and the inorganic particles 22 contained in the resin layer 20 increases, and thus the close adhesion between the inorganic layer 10 and the resin layer 20 increases. When the percentage of the inorganic particles 22 is 70 vol % or less, the proportion of the resin 21 in the resin layer 20 becomes higher, and it is possible to form the composite member 1 maintaining the properties of the resin 21. The percentage of the inorganic particles 22 is more preferably 15 vol % or more, even more preferably 20 vol % or more. The percentage of the inorganic particles 22 is more preferably 50 vol % or less, even more preferably 30 vol % or less.

A thickness t2 of the resin layer 20 is not limited but can be 50 μm or mare, for example. Note that the thickness t2 of the composite member 1 can be 1 mm or more or 1 cm or more. There is no particular upper limit for the thickness t2 of the composite member 1, but the thickness t2 can be 50 cm, for example.

The shape of the composite member 1 is not limited but can be a plate shape or a film shape, for example. A thickness t3 of the composite member 1 is not limited but can be 50 μm or more, for example. The composite member 1 according to the present embodiment is formed through a pressure heating method as described below, and it is possible to easily obtain the composite member 1 having a large thickness. Note that the thickness t3 of the composite member 1 can be 1 mm or more or 1 cm or more. There is no particular upper limit for the thickness t3 of the composite member 1, but the thickness t3 can be 50 cm, for example.

As described above, the composite member 1 according to the present embodiment includes the inorganic layer 10 containing an inorganic substance containing at least one of a metal oxide or a metal oxide hydroxide. The composite member 1 includes the resin layer 20 provided on the surface of the inorganic layer 10 and containing the resin 21 and the inorganic particles 22 that are dispersed in the resin 21 and some of which adhere directly to the inorganic substance of the inorganic layer 10. The porosity in the cross section of the inorganic layer 10 is 20% or less, and a peak derived from a hydroxyl group is detected for the inorganic layer 10 when measurement is performed using infrared spectroscopy or X-ray diffraction.

In the composite member 1 according to the present embodiment, some of the inorganic particles 22 of the resin layer 20 adhere directly to the inorganic substance of the inorganic layer 10. Thus, in the composite member 1, the inorganic layer 10 and the resin layer 20 are firmly joined together with no adhesive interposed therebetween. Since the porosity in the cross section of the inorganic layer 10 is 20% or less and the occurrence of cracks in the inorganic layer 10 starting from pores is prevented, it is possible to enhance the bending strength of the composite member 1. Since the inorganic layer 10 can be obtained by pressurizing while heating at a low temperature as described below, a member having low heat resistance can be added to the inorganic layer 10, for example.

[Method of Producing Composite Member]

Next, a method of producing the composite member 1 according embodiments will be described.

First, a method of producing the composite member 1 is described in which the inorganic substance contained in the inorganic layer 10 is boehmite. The composite member 1 in which the inorganic substance is boehmite can be produced by mixing hydraulic alumina with a solvent containing water and then heating it under pressure. Hydraulic alumina is an oxide obtained through heat treatment of aluminum hydroxide and contains ρ-alumina. Such hydraulic alumina has properties of being bound and hardened through a hydration reaction, Thus, by using the pressure heating method, a hydration reaction of hydraulic alumina proceeds and hydraulic alumina particles are hound to each other, and thus the crystal structure changes to boehmite, which makes it possible to form the inorganic layer 10.

Specifically, a mixture is first prepared by mixing a hydraulic alumina powder with a solvent containing water. The solvent containing water is preferably pure water or ion-exchanged water. The solvent containing water may contain an acidic or alkaline substance in addition to water. It is enough for the solvent containing water to contain water as the main component, and for example, an organic solvent, such as an alcohol, may be contained.

The amount of a solvent added to hydraulic alumina is preferably an amount sufficient for a hydration reaction of the hydraulic alumina to proceed. The amount of the solvent added is preferably 20 to 200 mass %, more preferably 50 to 150 mass %, with respect to the hydraulic alumina.

Next, a resin layer containing a resin and inorganic particles is arranged inside a die. Then, the mixture obtained by mixing the hydraulic alumina and the solvent containing water is filled inside the die in such a way that the mixture is arranged on the surface of the resin layer. After being filled with the mixture, the die may be heated as necessary. Then, applying pressure to the resin layer and the mixture arranged inside the die causes the inside of the die to be a high pressure state. In this process, the hydraulic alumina becomes highly packed, and thus the particles of the hydraulic alumina are bound to each other to achieve high density. Specifically, adding water to the hydraulic alumina causes a hydration reaction of the hydraulic alumina to form boehmite and aluminum hydroxide on the surface of hydraulic alumina particles. Then, by pressurizing the mixture while heating inside the die, the formed boehmite and aluminum hydroxide both diffuse between adjacent hydraulic alumina particles, and the hydraulic alumina particles are gradually bound to each other. Subsequently, the crystal structure changes from aluminum hydroxide to boehmite as a dehydration reaction proceeds through heating. Note that it is supposed that the above-described hydration reaction of hydraulic alumina, interdiffusion between hydraulic alumina particles, and dehydration reaction proceed almost at the same time. Pressurizing the above-described mixture and resin layer while heating causes the inorganic substance derived from the mixture to adhere directly to some of the inorganic particles in the resin layer. For example, some of the hydraulic alumina particles adhere directly to some of the inorganic particles in the resin layer.

Then, taking out the molded body from the inside of the die provides the composite member 1 including the inorganic layer 10 and the resin layer 20.

Note that the heating and pressurizing conditions for the mixture obtained by mixing hydraulic alumina with a solvent containing water are not limited as long as the reaction between the hydraulic alumina and the solvent proceeds. For example, it is preferable to pressurize the mixture obtained by mixing the hydraulic alumina and the solvent containing water at a pressure of 10 to 600 MPa while heating at 50 to 300° C. Note that the temperature for heating the mixture obtained by mixing the hydraulic alumina and the solvent containing water is more preferably 80 to 250° C., even more preferably 100 to 200° C. When a resin contained in the resin layer is a thermoplastic resin, it is preferable to perform heating at a temperature equal to or lower than the melting point of the thermoplastic resin. The pressure for pressurizing the mixture obtained by mixing the hydraulic alumina and the solvent containing water is more preferably 50 to 600 MPa, even more preferably 200 to 600 MPa.

Next, another method of producing the composite member 1 is described in which the inorganic substance contained in the inorganic layer 10 is boehmite. The composite member 1 in which the inorganic substance is boehmite can be produced by mixing an aluminum nitride powder with a solvent containing water and then heating it under pressure.

Specifically, a mixture is first prepared by mixing an aluminum nitride powder with a solvent containing water. The solvent containing water is preferably pure water or ion-exchanged water. The solvent containing water may contain an acidic or alkaline substance in addition to water. It is enough for the solvent containing water to contain water as the main component, and for example, an organic solvent, such as an alcohol, may be contained. The solvent containing water may contain ammonia.

The amount of a solvent added to aluminum nitride is preferably an amount sufficient for a hydrolysis reaction of the aluminum nitride described below to proceed to form aluminum hydroxide on the surface of the aluminum nitride. The amount of the solvent added is preferably 5 to 100 mass %, more preferably 20 to 80 mass %, with respect to the aluminum nitride.

Next, a resin layer containing a resin and inorganic particles is arranged inside a die. Then, the mixture obtained by mixing the aluminum nitride with the solvent containing water is filled inside the die in such a way that the mixture is arranged on the surface of the resin layer, After being filled with the mixture, the die is heated as necessary. Then, applying pressure to the resin layer and the mixture arranged inside the die causes the inside of the die to be a high pressure state. In this process, the aluminum nitride becomes highly packed, and thus the particles of the aluminum nitride are bound to each other to achieve high density. Specifically, pressurizing the mixture while heating causes a reaction of the aluminum nitride with water to form aluminum hydroxide on the surface of the aluminum nitride. The formed aluminum hydroxide diffuses between adjacent aluminum nitride particles, and thus the aluminum nitride particles are gradually bound to each other. Subsequently, the crystal structure changes from aluminum hydroxide to boehmite as the dehydration reaction proceeds by heating. Consequently, adjacent aluminum nitride particles are bound to each other through a boehmite phase containing boehmite. Pressurizing the above-described mixture and resin layer while heating causes the inorganic substance derived from the mixture to adhere directly to some of the inorganic particles in the resin layer.

Then, taking out the molded body from the inside of the die provides the composite member 1 including the inorganic layer 10 and the resin layer 20.

Note that the heating and pressurizing conditions for the mixture obtained by mixing aluminum nitride with a solvent containing water are not limited as long as the reaction between the aluminum nitride and the solvent and the dehydration reaction of the aluminum hydroxide proceed. For example, it is preferable to pressurize the above-described mixture at a pressure of 10 to 600 MPa while heating at 50 to 300° C. When a resin contained in the resin layer is a thermoplastic resin, it is preferable to perform heating at a temperature equal to or lower than the melting point of the thermoplastic resin, Note that the temperature for heating the above-described mixture is more preferably 80 to 250° C., even more preferably 100 to 200° C. The pressure for pressurizing the above-described mixture is more preferably 50 to 600 MPa, even more preferably 200 to 600 MPa.

Next, a method of producing the composite member 1 is described in which the inorganic substance contained in the inorganic layer 10 is a metal oxide. A solvent is added to an inorganic substance powder. The solvent is not limited, but one capable of dissolving part of the inorganic substance when the inorganic substance powder is pressurized and heated can be used, for example. A solvent capable of reacting with the inorganic substance to produce an inorganic substance different from the said inorganic substance can be used. As such a solvent, at least one selected from the group consisting of an acidic aqueous solution, an alkaline aqueous solution, water, an alcohol, a ketone, and an ester can be used. As the acidic aqueous solution, an aqueous solution of pH 1 to 3 can be used. As the alkaline aqueous solution, an aqueous solution of pH 10 to 14 can be used. As the acidic aqueous solution, an aqueous solution of an organic acid is preferably used. As the alcohol, an alcohol having a carbon number of 1 to 12 is preferably used.

Next, a resin layer containing a resin and inorganic particles is arranged inside a die. Then, the mixture containing the inorganic substance and the solvent is filled inside the die in such a way that the mixture is arranged on the surface of the resin layer. After being filled with the mixture, the die may be heated as necessary. Then, applying pressure to the resin layer and the mixture arranged inside the die causes the inside of the die to be a high pressure state. In this process, the inorganic substance in the mixture becomes denser, and at the same time, particles of the inorganic substance are bound to each other. Pressurizing the above-described mixture and resin layer while healing causes the inorganic substance derived from the mixture to adhere directly to some of the inorganic particles in the resin layer.

When a solvent is used that dissolves part of the inorganic substance, an inorganic compound contained in the inorganic substance is dissolved in the solvent under high pressure. The dissolved inorganic compound penetrates vacant spaces in the inorganic substance. Then, by removing the solvent in the mixture in this state, the binding part 12 derived from the inorganic substance is formed in the inorganic substance. When a solvent is used that reacts with an inorganic substance to produce an inorganic substance different from the said inorganic substance, an inorganic compound making up the inorganic substance reacts with the solvent under high pressure. The different inorganic substance produced through the reaction is then filled in vacant gaps in the said inorganic substance to form the binding part 12 derived from the different inorganic substance.

The heating and pressurizing conditions for the mixture containing the inorganic substance and the solvent are not limited as long as the dissolution of the surface of the inorganic substance proceeds when a solvent is used that dissolves part of the inorganic substance. The heating and pressurizing conditions for the mixture are not limited as long as the reaction between the inorganic substance and the solvent proceeds when a solvent is used that reacts with an inorganic substance to produce an inorganic substance different from the said inorganic substance. For example, the mixture containing the inorganic substance and the solvent is preferably heated at 50 to 300° C. and then pressurized at a pressure of 10 to 600 MPa. Note that the temperature for heating the mixture containing the inorganic substance and the solvent is more preferably 80 to 250° C., even more preferably 100 to 200° C. When a resin contained in the resin layer is a thermoplastic resin, it is preferable to perform heating at a temperature equal to or lower than the melting point of the thermoplastic resin. The pressure for pressurizing the mixture containing the inorganic substance and the solvent is more preferably 50 to 400 MPa, even more preferably 50 to 200 MPa.

Then, taking out the molded body from the inside of the die provides the composite member 1 including the inorganic layer 10 and the resin layer 20.

Here, a sintering method is known as a method of producing an inorganic member including ceramic. The sintering method is a method of obtaining a sintered body by heating an aggregate of solid powder containing an inorganic substance at a temperature lower than the melting point. However, in the sintering method, the solid powder is heated to 1000° C. or higher, for example. Thus, if the sintering method is used to obtain the inorganic layer 10 containing organic matter having a low heat resistance, the organic matter will be carbonized through heating at the high temperature. However, in the method of producing the composite member 1 according to the present embodiment, carbonization of organic matter hardly occurs because the heating is performed at a low temperature of 300° C. or less.

In the production method according to the present embodiment, since the inorganic substance powder is pressurized while being heated, the inorganic substance aggregates to form the dense inorganic layer 10. Consequently, the number of pores inside the inorganic layer 10 is reduced, and thus it is possible to provide the composite member 1 having high strength.

As described above, the method of producing the composite member 1 according to the present embodiment includes a step of mixing hydraulic alumina with a solvent containing water to obtain a mixture, and a step of pressurizing and heating a resin layer and the mixture with the mixture arranged on the surface of the resin layer. The heating and pressurizing conditions of the mixture are preferably a temperature of 50 to 300° C. and a pressure of 10 to 600 MPa. In this production method, since the composite member 1 is molded under low temperature conditions, the obtained inorganic layer 10 mainly contains a boehmite phase. Thus, it is possible to obtain, using a simple method, the composite member 1 being lightweight and having excellent chemical stability.

A method of producing the composite member 1 according to another embodiment includes a step of mixing aluminum nitride particles with a solvent containing water to obtain a mixture, and a step of pressurizing and heating a resin layer and the mixture with the mixture arranged on the surface of the resin layer. The heating and pressurizing conditions of the mixture are preferably a temperature of 50 to 300° C. and a pressure of 10 to 600 MPa. Since the production method according to the present embodiment has a low heating temperature, in the obtained inorganic layer 10, aluminum nitride particles are bound to each other through a boehmite phase. Thus, it is possible to obtain, using a simple method, the composite members 1 that has excellent mechanical strength and excellent chemical stability.

A method of producing the composite member 1 according to another embodiment includes a step of mixing a solvent that dissolves an inorganic substance or a solvent that reacts with an inorganic substance, and an inorganic substance powder to obtain a mixture. The method includes a step of pressurizing and heating a resin layer and the mixture with the mixture arranged on the surface of the resin layer. The heating and pressurizing conditions of the mixture are preferably a temperature of 50 to 300° C. and a pressure of 10 to 600 MPa. In the production method according to the present embodiment, since the composite member 1 is formed under such low-temperature conditions, it is possible to prevent changes in physical or chemical properties due to heat. It is thus possible to obtain the composite member 1 being applicable to various uses.

[Member Including Composite Member]

Next, a member including the composite member 1 will be described. As described above, the composite member 1 is formable into a plate shape having a large thickness and has excellent stability as it is dense. The composite member 1 has high mechanical strength, and thus can be cut in the same manner as a general ceramic member and can undergo a surface treatment. Thus, the composite member 1 can be suitably used as a building material. The building material is not limited, and possible examples include an exterior wall material (siding) and a roof material. Road materials and outer groove materials are also possible examples of the building material.

It is also possible to suitably use the composite member 1 as an electronic equipment material. Possible examples of the electronic equipment material include structural materials, heat-resistant materials, insulating materials, heat dissipation materials, heat insulating materials, sealing materials, circuit boards, and optical materials.

EXAMPLES

Embodiments will be described in more detail below with reference to examples, but the embodiments are not limited to these examples.

Example 1

First, hydraulic alumina. BK-112 manufactured by SUMITOMO CHEMICAL COMPANY, LIMITED was prepared as an inorganic substance. The hydraulic alumina has a median particle size of 1.6 μm. The hydraulic alumina is a mixture of boehmite and gibbsite (aluminum hydroxide). Note that the hydraulic alumina also includes ρ alumina. After ion-exchanged water is weighed to be 80 mass % of the hydraulic alumina, a mixture was obtained by mixing the hydraulic alumina with the ion-exchanged water using an agate mortar and pestle.

A resin plate that has a thickness of 2 mm and contains a resin and inorganic particles was prepared. The inorganic particles were kneaded into the resin to be 33 parts by mass to the resin plate. For the resin plate, a thermoplastic acrylic resin was used as the resin, and hydraulic alumina BK-112 manufactured by SUMITOMO CHEMICAL COMPANY, LIMITED was used as the inorganic particles. The thermoplastic acrylic resin was obtained by mixing 75 mass % of MMA manufactured by MITSUBISHI GAS CHEMICAL COMPANY, INC. and 25 wt % of PMMA manufactured by ASAHI KAGAKU KOGYO CO., LTD., adding 0.3 mass % of Trigonox 121-50E manufactured by KAYAKU AKZO CORPORATION as a polymerization initiator, and performing thermal setting. Thermosetting conditions were 70° C. for 1.5 hours, 80° C. for 0.5 hours, and 120° C. for 1 hour, and heating was performed in this order.

Next, a resin plate was arranged inside a cylindrical die (Φ10) having an internal space. The die was then filled with the mixture obtained as described above in such a manner that the mixture was arranged on the surface of the resin plate. Then, the resin plate and the mixture arranged inside the die were heated and pressurized under conditions of 400 MPa, 80° C., and 10 minutes, and thus a composite member including an inorganic layer and a resin layer was obtained as a test sample.

Example 2

A composite member was obtained as a test sample in the same manner as in the example 1 except that the inorganic particles used for the resin plate were changed to silica particles (fused silica F207C manufactured by FUMITECH Co., Ltd.).

Comparative Example 1

A composite member was obtained as a test sample in the same manner as in the example 1 except that the inorganic particles were not kneaded into the resin plate.

[Evaluation]

(Scotch Tape Test)

The resin layer of each test sample, which was cylindrical, was fixed, and tape (product No. 29) manufactured by Nitto Denko Corporation was applied to the surface of the inorganic layer while preventing air bubbles from entering and was vigorously peeled from the inorganic layer to evaluate the adhesiveness between the inorganic layer and the resin layer. The result of the scotch tape test is shown in Table 1.

TABLE 1

|  | Scotch tape test |
| --- | --- |
| Example 1 | No separation |
| Example 2 | No separation |
| Comparative example 1 | Separation |

As shown in Table 1, as a result of the scotch tape test, the inorganic layer and the resin layer did not separate from each other in the test samples of the example 1 and the example 2, while separation occurred in the test sample of the comparative example 1. From this result, it is seen that adding the inorganic particles to the resin layer improves the adhesiveness between the inorganic layer and the resin layer.

(Cross Section Observation)

Figure 5:
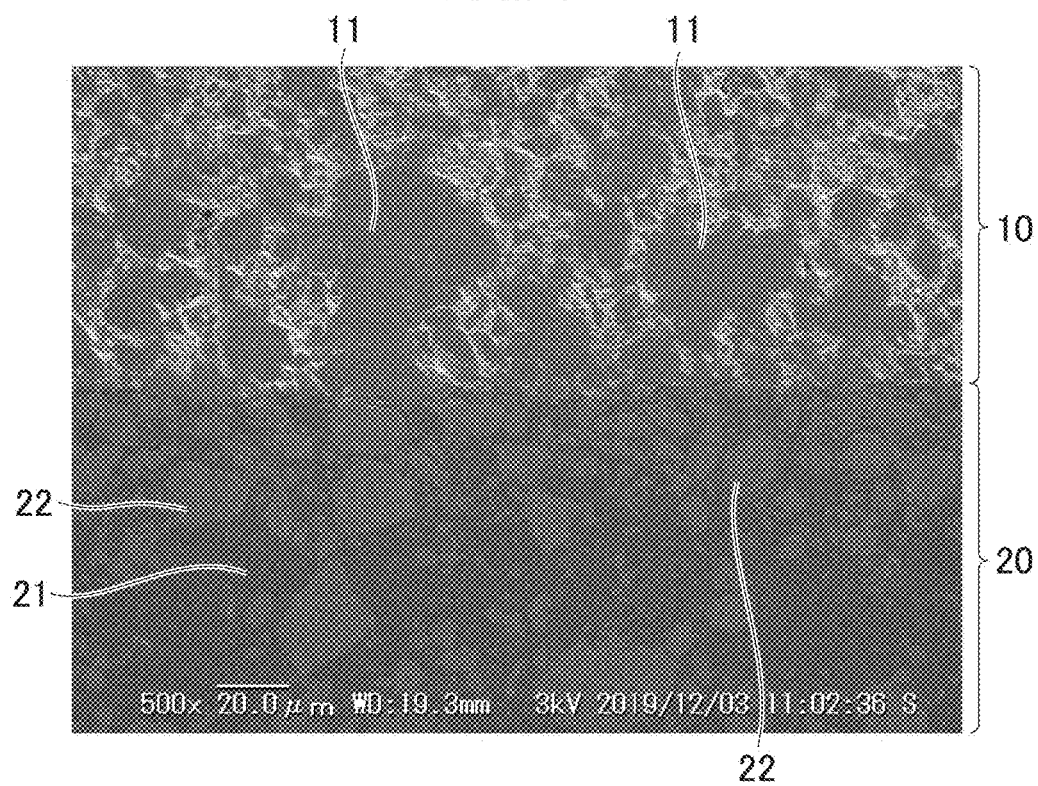
FIG. 5 is an SEM image of a test sample of an example 1 observed at a magnification of 500.
Figure 6:
FIG. 6 is an SEM image of the test sample of the example 1 observed at a magnification of 5,000.
Figure 7:
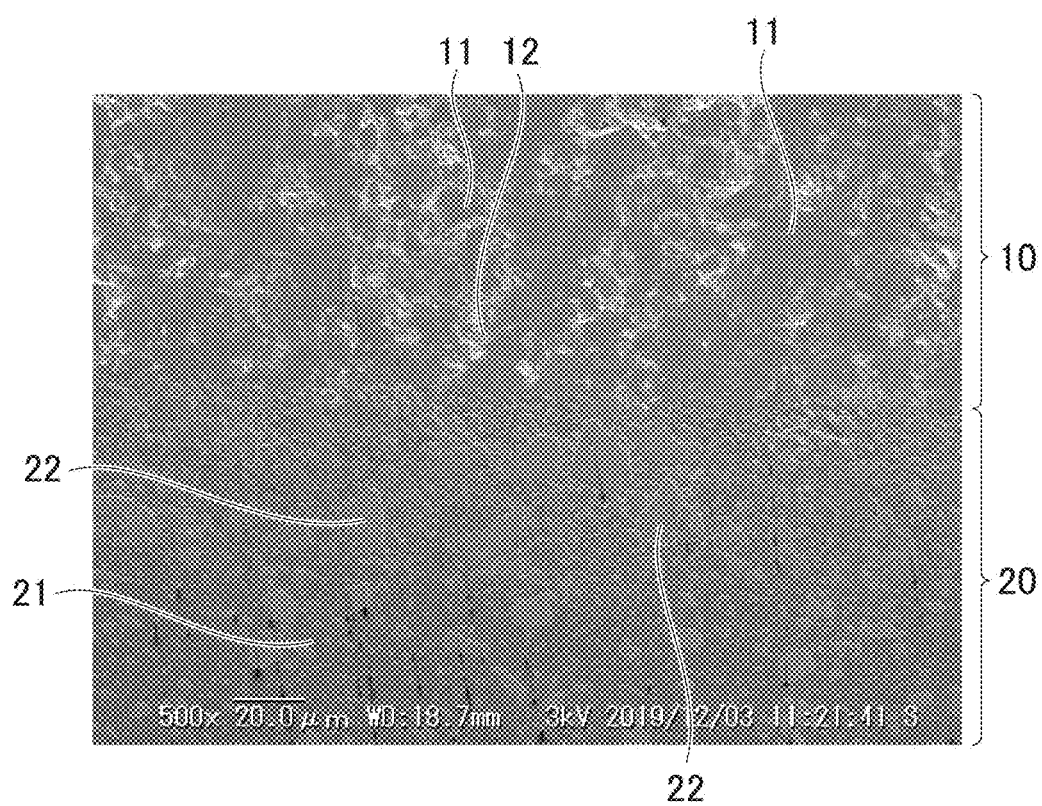
FIG. 7 is an SEM image of a test sample of an example 2 observed at a magnification of 500.
Figure 8:
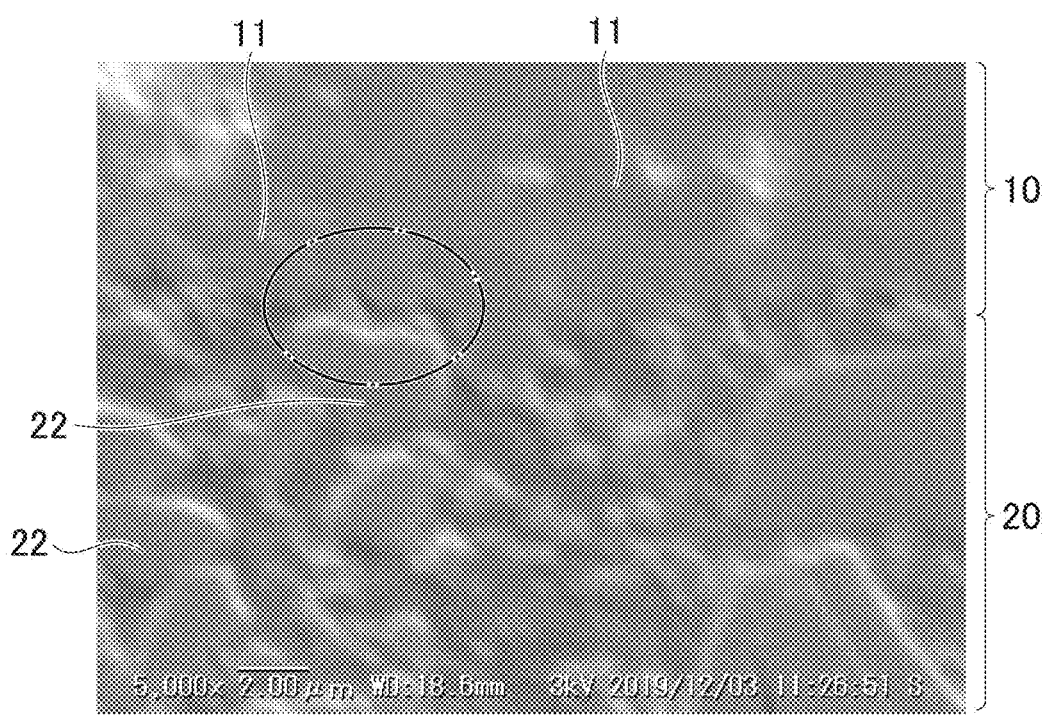
FIG. 8 is an SEM image of the test sample of the example 2 observed at a magnification of 5,000.
Figure 9:
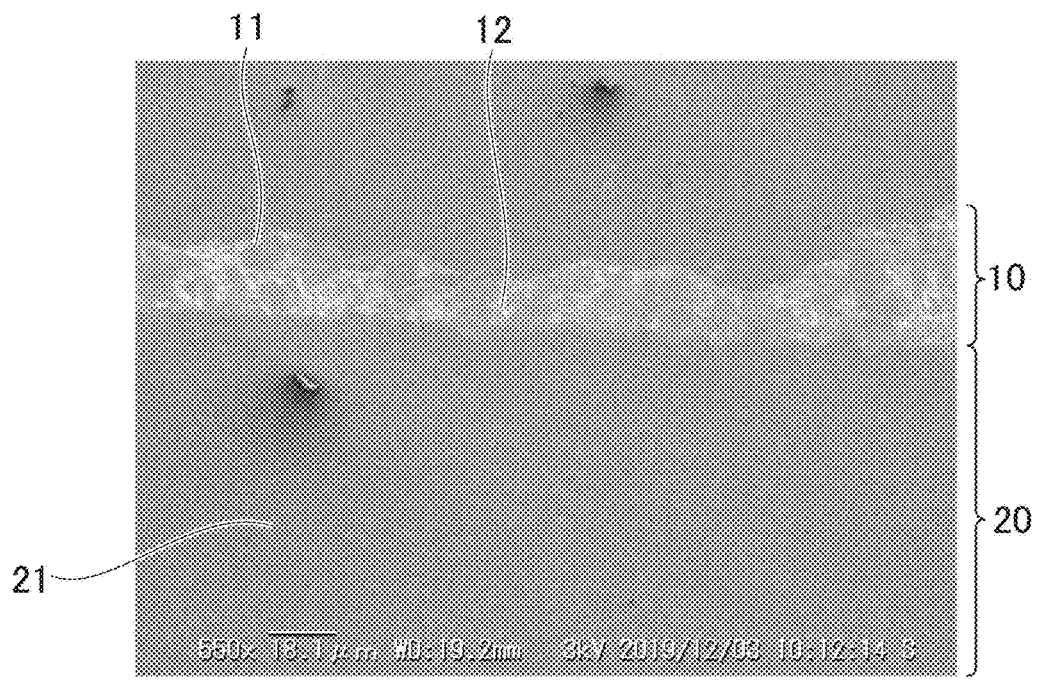
FIG. 9 is an SEM image of a test sample of a comparative example 1 observed at a magnification of 500.
Figure 10:
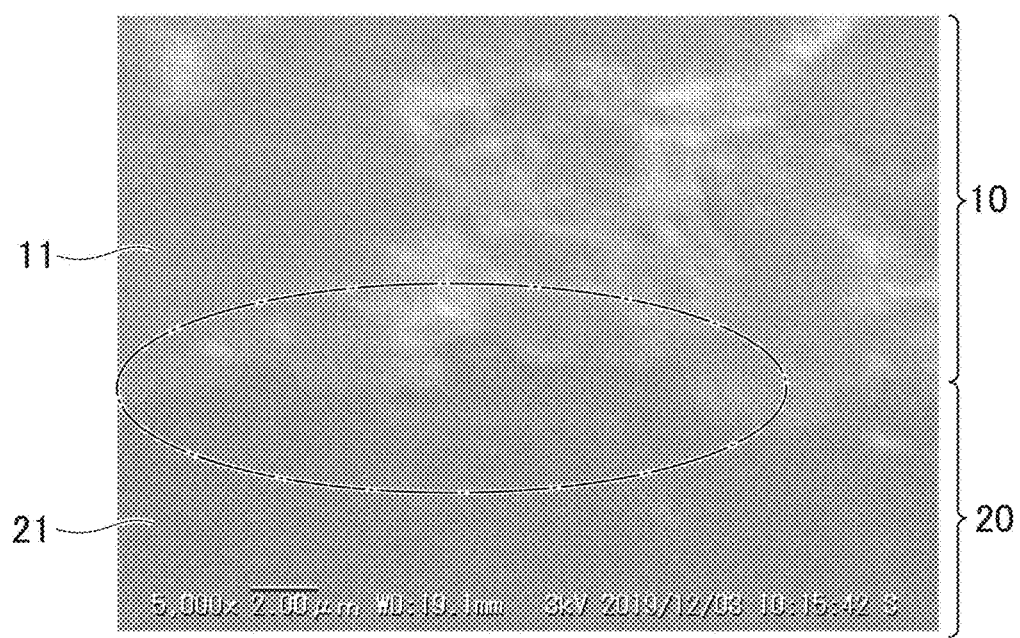
FIG. 10 is an SEM image of the test sample of the comparative example 1 observed at a magnification of 5,000.

Cross sections of cut cylindrical test samples were observed using a scanning electron microscope (SEM). Observation surfaces were sputtered with gold, FIG. 5 is an SEM image of the test sample of the example 1 observed at a magnification of 500. FIG. 6 is an SEM image of the test sample of the example 1 observed at a magnification of 5,000. FIG. 7 is an SEM image of the test sample of the example 2 observed at a magnification of 500, FIG. 8 is an SEM image of the test sample of the example 2 observed at a magnification of 5,000. FIG. 9 is an SEM image of the test sample of the comparative example 1 observed at a magnification of 500. FIG. 10 is an SEM image of the test sample of the comparative example 1 observed at a magnification of 5,000.

In the SEM image of the example 1, as seen in the frames in FIG. 6, an inorganic particle 22 contained in the resin layer 20 and a particle 11 contained in the inorganic layer 10 were bound in a continuous manner as one body. In the SEM image of the example 2, as illustrated in the frame in FIG. 8, an inorganic particle 22 contained in the resin layer 20 and a particle 11 contained in the inorganic layer 10 adhere directly, to each other, although they were not bound in a continuous manner as one body. In the SEM image of the comparative example 1, as illustrated in the frame in FIG. 10, vacant spaces were observed between the resin layer 20 and the inorganic layer 10.

From the results of the scotch tape test and the cross section observation, it is considered that when the resin layer 20 contains the inorganic particles 22, the adhesiveness between the resin layer 20 and the inorganic layer 10 is improved because the inorganic particles 22 adhere directly to the inorganic substance contained in the inorganic layer 10.

(Porosity Measurement)

Figure 11:
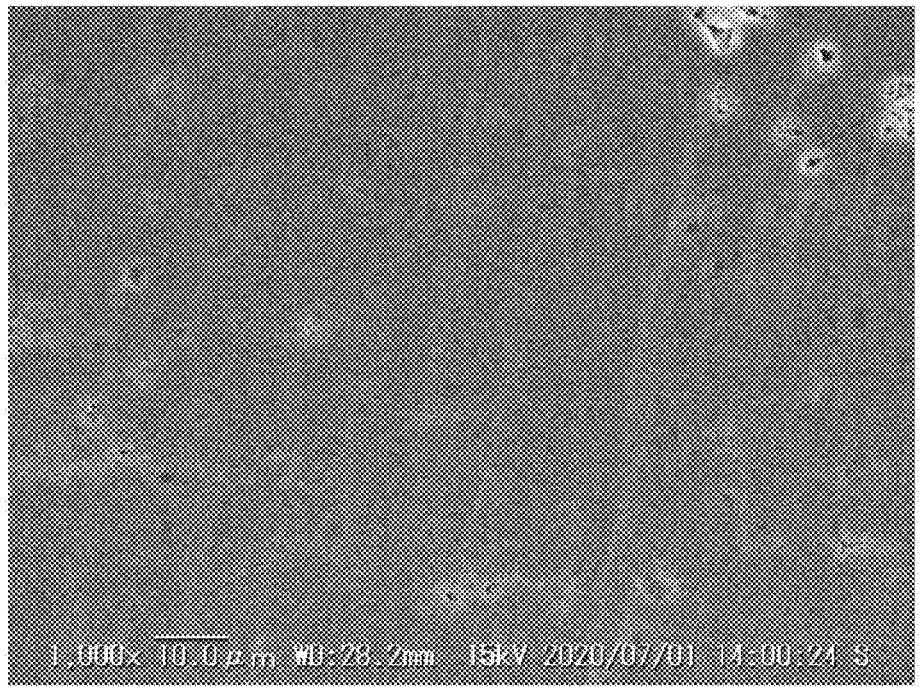
FIG. 11 is a diagram illustrating a reflected electron image at position 1 in the test sample 1 of the example 1.
Figure 13:
FIG. 13 is a diagram illustrating a reflected electron image at position 2 in the test sample 1 of the example 1.
Figure 15:
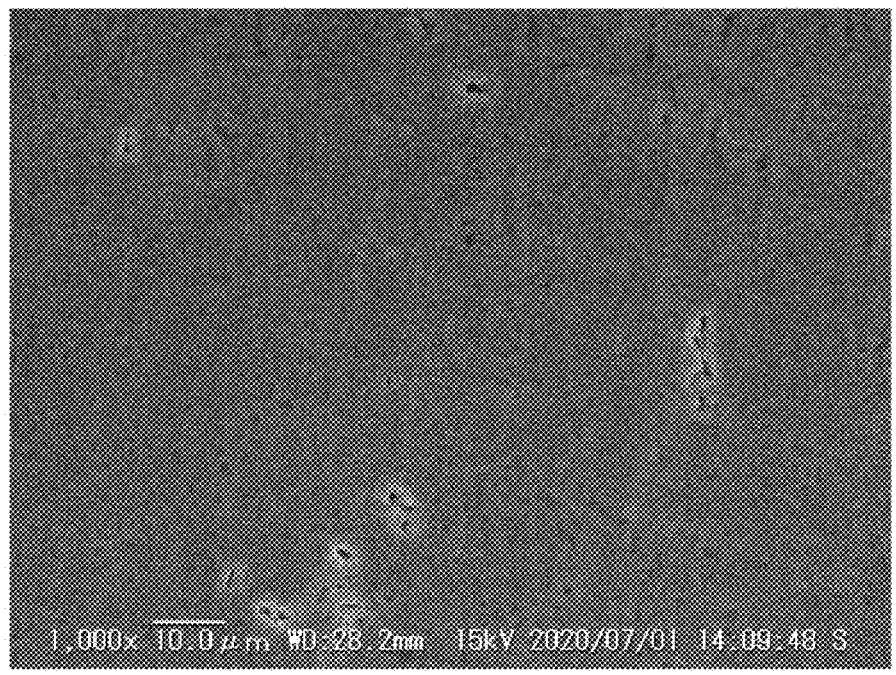
FIG. 15 is a diagram illustrating a reflected electron image at position 3 in the test sample 1 of the example 1.

First, cross section polisher processing (CP processing) was applied to the cross section of the test sample of the example 1, which was cylindrical. Then, using a scanning electron microscope (SEM), a reflected electron image was observed at a magnification of 2,000 on the cross section of the test sample of the example 1. FIGS. 11, 13, and 15 illustrate reflected electron images obtained by observing three points (positions 1 to 3) in the cross section of the test sample of the example 1.

Figure 12:
FIG. 12 is a diagram illustrating a binarized image of the reflected electron image at position 1 in the test sample 1 of the example 1.
Figure 14:
FIG. 14 is a diagram illustrating a binarized image of the reflected electron image at position 2 in the test sample 1 of the example 1.
Figure 16:
FIG. 16 is a diagram illustrating a binarized image of the reflected electron image at position 3 in the test sample 1 of the example 1.

Next, through binarizing the SEM images of the three fields, the pore portions were clarified. The binarized images of the reflected electron images of FIGS. 11, 13, and 15 are illustrated in FIGS. 12, 14, and 16, respectively. In FIGS. 12, 14, and 16, black parts are pores. Then, the area percentage of the pore portion was calculated from the binarized image, and the average value was taken as the porosity. In FIG. 12, the area percentage of the pore portion at position 1 was 0.69%. In FIG. 1.4, the area percentage of the pore portion at position 2 was 0.75%. In FIG. 16, the area percentage of the pore portion at position 3 was 1.14%. Thus, the porosity of the test sample of the example 1 was 0.86%, which is the average value of the area percentage of the pore portion at positions 1 to 3.

From the measurement result of the porosity, it was found that the porosity of the inorganic layer in the example 1 was small. Since the porosity of the inorganic layer is small, it is considered that the occurrence of cracks in the inorganic layer starting from pores is prevented. Note that although only the porosity of the inorganic layer in the example 1 was evaluated, the same result is expected for the inorganic layer in the example 2 as it was made with the same materials and method.

(FT-IR (Fourier Transform Infrared Spectroscopy))

Figure 17:
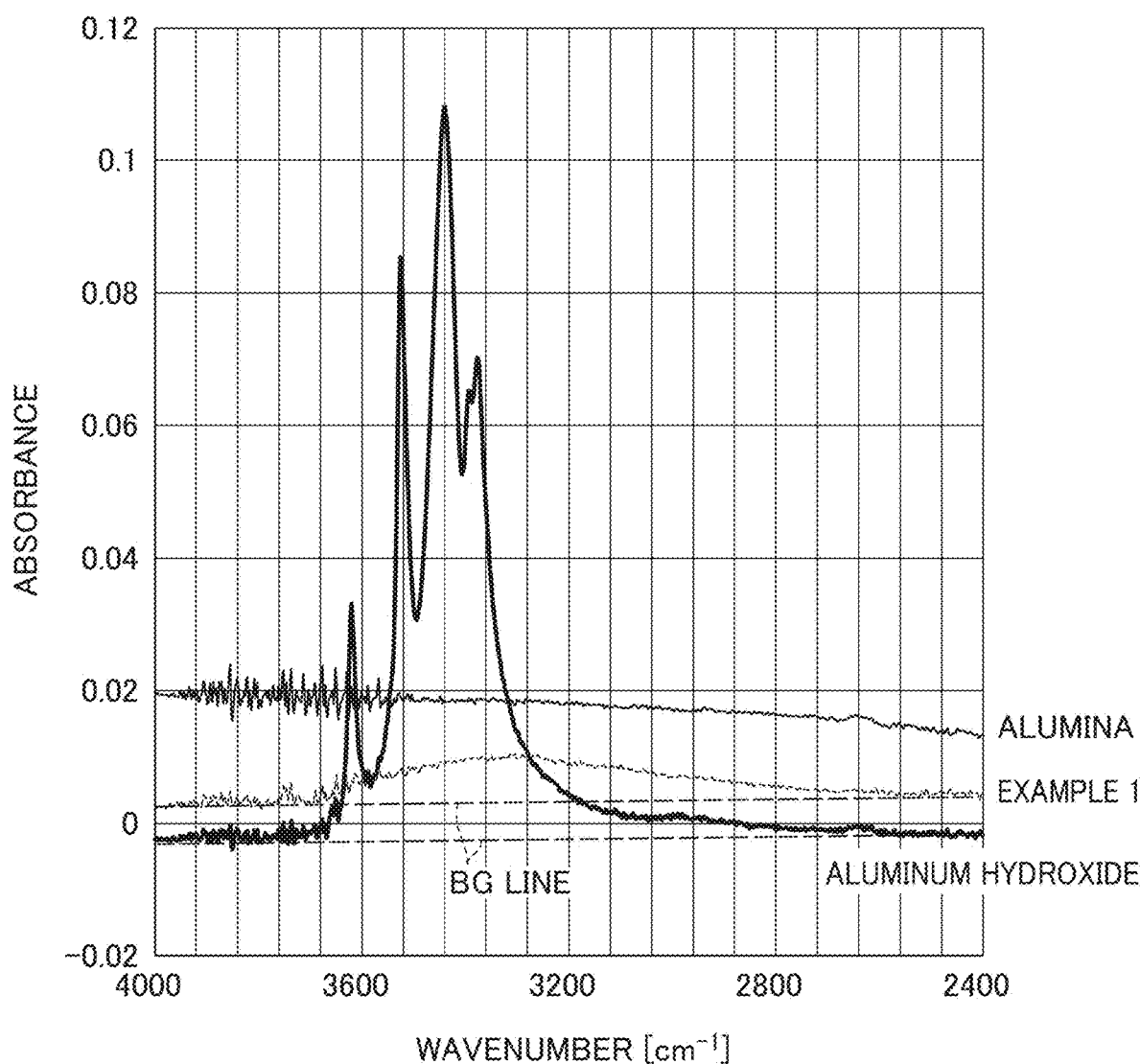
FIG. 17 illustrates infrared absorption spectra of an inorganic layer of the example 1, alumina, and aluminum hydroxide.

The infrared absorption spectrum of the inorganic layer in the example 1 was measured using an IR Tracer-100 of SHIMADZU CORPORATION. Note that as a negative control, high-purity alumina AA-3 powder manufacture by SUMITOMO CHEMICAL. COMPANY, LIMITED was also measured using the same method. Also, as a positive control, aluminum hydroxide KH-108 manufactured by KC Corporation was measured using the same method. The infrared absorption spectrum was measured using a transmission method as the measurement mode, 400 to 7500 cm$^{-1}$ (1.33 to 25 μm) as the measurement area, and 30 times as the number of times of integration. FIG. 17 illustrates the infrared absorption spectra of the inorganic layer of the example 1, alumina, and aluminum hydroxide.

Next, a peak area of a peak derived from a hydroxyl group was calculated from the obtained infrared absorption spectrum. Specifically, the peak area was calculated according to equation (1) below.

[Math 1]

$$S1 = \int_{\tilde{v}_1}^{\tilde{v}_2} (A(\tilde{v}) - BG(\tilde{v})) \Delta(\tilde{v}) \quad (1)$$

In equation (1) above, S1 represents a peak area (cm$^{-1}$), $v_1$ represents a wavenumber of 2600 cm$^{-1}$ and $v_2$ represents a wavenumber of 3800 cm$^{-1}$, A(v) represents an absorbance at a wavenumber v, BG(v) represents an absorbance of a BG (background) line at the wavenumber v, and Δv represents a resolution (cm$^{-1}$) of a wavenumber. Note that the nu tilde in equation (1) above is denoted as v in the text. The BG line is a straight line connecting both bottom parts of a peak at a background region in an infrared absorption spectrum. The background region was defined as a wavenumber range from 2400 to less than 2600 cm$^{-1}$ and a wavenumber range from more than 3800 to 4000 cm$^{-1}$ or less. Table 2 shows the peak area of each infrared absorption spectrum.

TABLE 2

|  | Peak area [cm$^{-1}$] |
| --- | --- |
| Example 1 | 3.76 |
| Alumina | 1.16 |
| Aluminum hydroxide | 17.4 |

From the results in FIG. 17 and Table 2, the peak area of the inorganic layer in the example 1 was 3.76 cm$^{-1}$ compared with that of alumina whose peak area was at the background level, and a peak derived from a hydroxyl group was detected for the inorganic layer in the example 1. Although only the peak area of the inorganic layer in the example 1 was calculated, the same result is expected for the inorganic layer of the example 2 as it was made with the same materials and method.

(X-Ray Diffraction Measurement)

Figure 18:
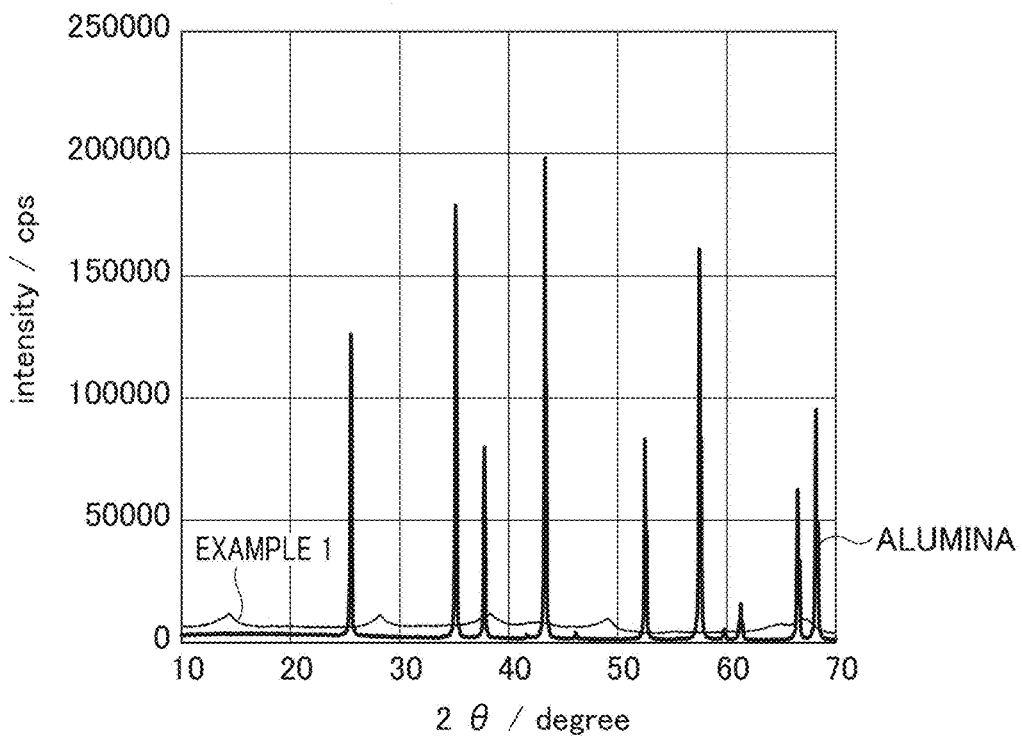
FIG. 18 is a graph illustrating an XRD pattern of the inorganic layer of the example 1, and an XRD pattern of alumina.
Figure 19:
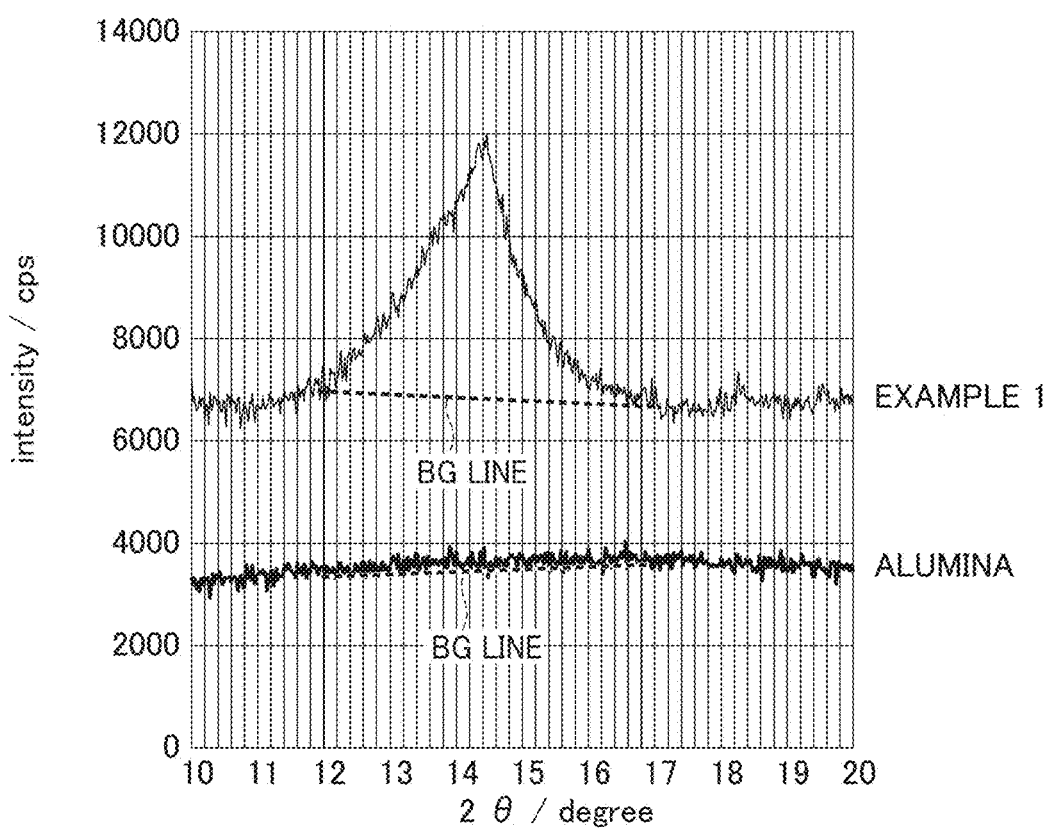
FIG. 19 is an enlarged graph of the XRD patterns in FIG. 18.

A MiniFlex powder X-ray diffraction (XRD) instrument made by Rigaku Corporation was used to measure an XRD pattern of powder obtained by pulverizing the inorganic layer of the example 1 in an alumina mortar. The X-ray source was CuKα (wavelength λ=1.54056 Å), the tube voltage was 40 kV, the tube current was 15 mA, and the measurement range was 2θ=10 to 70°. Note that as a negative control, the XRD pattern of high-purity alumina AA-3 powder manufacture by SUMITOMO CHEMICAL COMPANY, LIMITED was also measured using the same method. FIG. 18 is a graph illustrating the XRD pattern of the inorganic layer of the example 1 and the XRD pattern of alumina. FIG. 19 is an enlarged graph of the XRD pattern of FIG. 18.

Next, the peak area of a peak around a main peak (2θ=14.4°) of boehmite (AlOOH) was calculated from the obtained XRD pattern. Specifically, the peak area was calculated according to equation (2) below.

[Math 2]

$$S2 = \int_{2\theta_1}^{2\theta_2} (I(2\theta) - BG(2\theta)) \Delta(2\theta) \quad (2)$$

In equation (2) above, S2 represents a peak area (cm$^{-1}$), $2\theta_1$ represents an angle of 2θ=12°, and $2\theta_2$ represents an angle of 2θ=16.8°. I (2θ) represents the intensity (cps) at the angle 2θ, BG (2θ) represents the intensity (cps) of a BG (background) line at the angle 2θ, and Δ(2θ) represents a step angle (2θ=0.02°). The BG line is a straight line connecting both bottom parts of a peak at a background region in an XRD pattern. The background region was defined as an angular region from 11.5 to less than 12°, and an angular region from more than 16.8 to 17.3°. Table 3 shows the peak area of each XRD pattern.

TABLE 3

|  | Peak area [degree (2θ) · cps] |
| --- | --- |
| Example 1 | 8640 |
| Alumina | 244 |

From the results in FIGS. 18 and 19, and Table 3, the peak area of the inorganic layer in the example 1 was 8640° (2θ)·cps compared with that of alumina whose peak area was at the background level, and a peak derived from a hydroxyl group was detected in the inorganic layer in the example 1.

Figure 20:
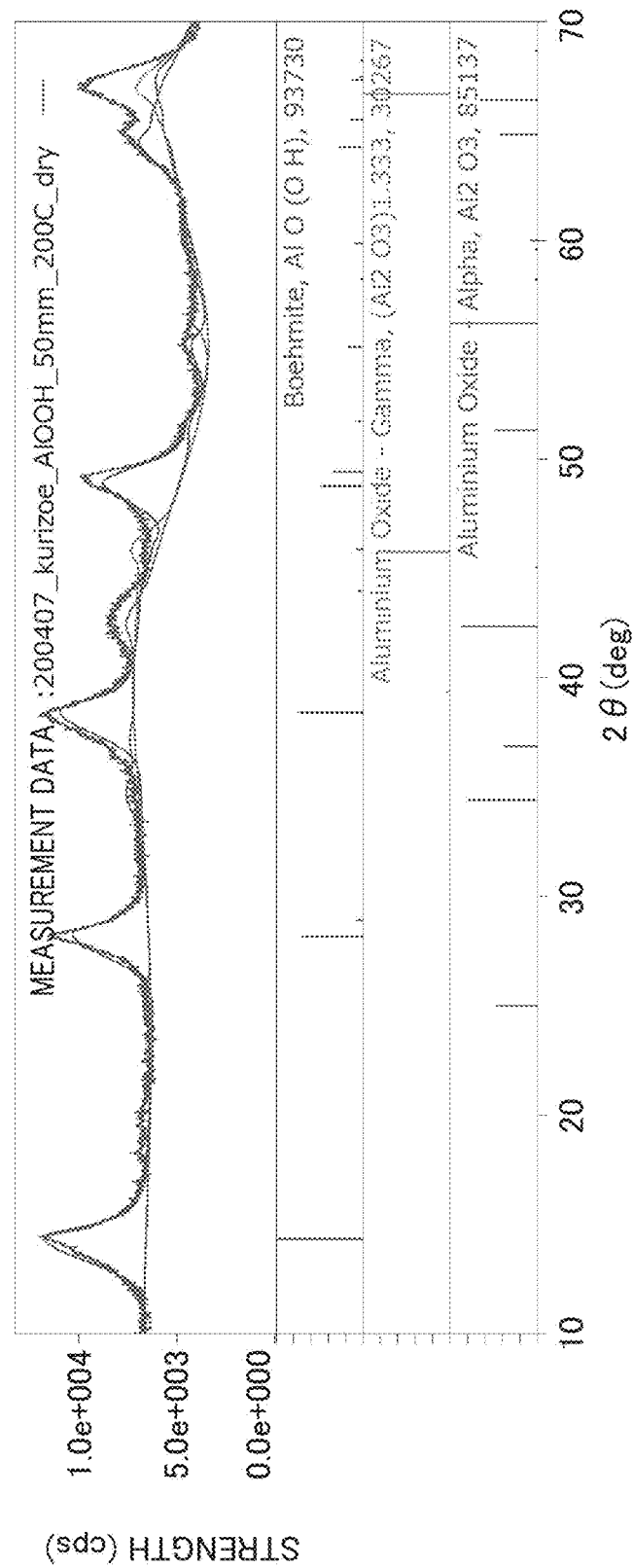
FIG. 20 is a graph illustrating a fitting result of the XRD pattern of the example 1, and XRD patterns of boehmite, γ alumina, and α alumina registered in the ICSD (Inorganic Crystal Structure Database)
Figure 21:
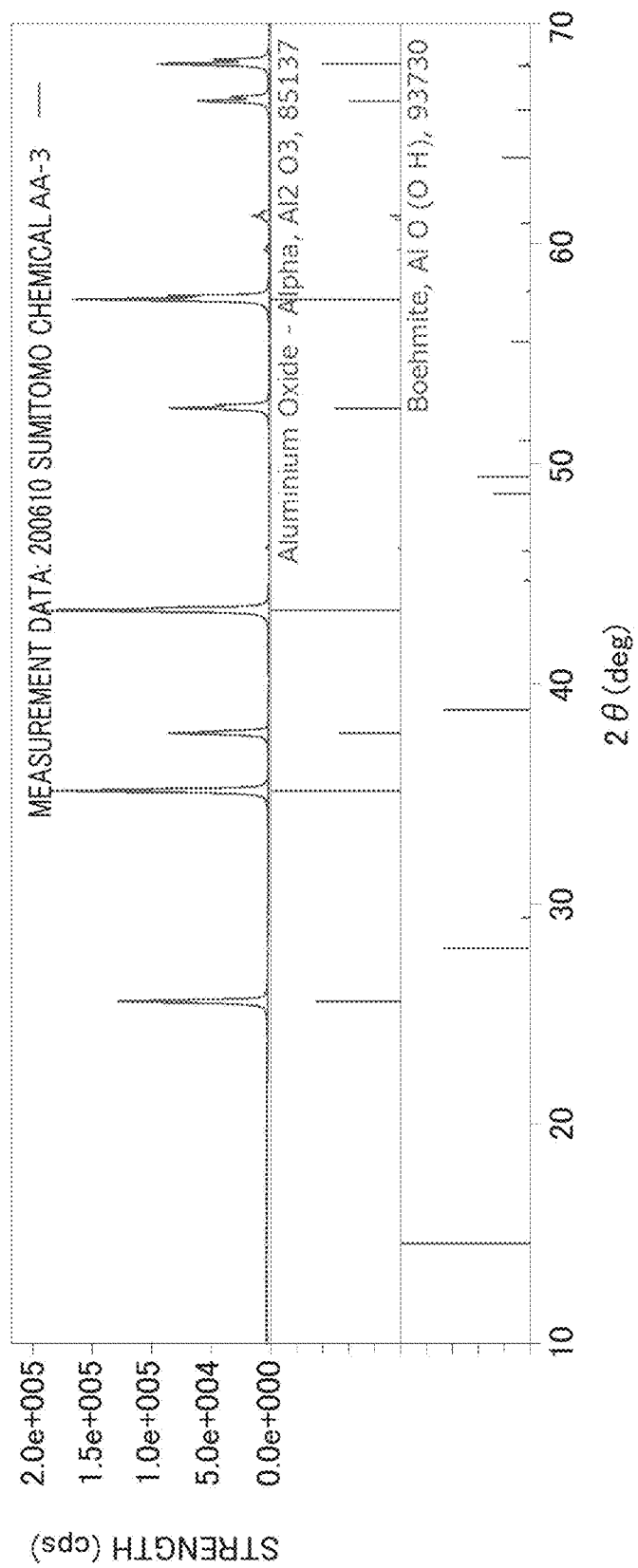
FIG. 21 is a graph illustrating a fitting result of an XRD pattern of alumina, and the XRD patterns of α alumina and boehmite registered in the ICSD.

The obtained XRD patterns were then subjected to Rietveld analysis to obtain the proportion of each phase. FIG. 20 is a graph illustrating, in order from the top, a fitting result of the XRD pattern of the example 1, and the XRD patterns of boehmite, γ alumina, and α alumina registered in the ICSD (Inorganic Crystal Structure Database). FIG. 21 is a graph illustrating, in order from the top, a fitting result of the XRD pattern of alumina, and the XRD patterns of α alumina and boehmite registered in the ICSD. Table 4 illustrates the proportion of each phase obtained through the Rietveld analysis.

TABLE 4

|  | Example 1 | Alumina |
| --- | --- | --- |
| Boehmite | 56 | 1.7 |
| α alumina | 14 | 98.3 |
| γ alumina | 29 | — |

As a result of the Rietveld analysis, the inorganic layer of the example 1 contained 56 mass % of a boehmite phase compared with alumina in which the percentage of a boehmite phase was at the background level, and a peak derived from a hydroxyl group was detected for the inorganic layer in the example 1. Although only the inorganic layer of the example 1 was analyzed, the same result is expected for the inorganic layer of the example 2 as it was made with the same materials and method.

(TG (Thermogravimetry))

Figure 22:
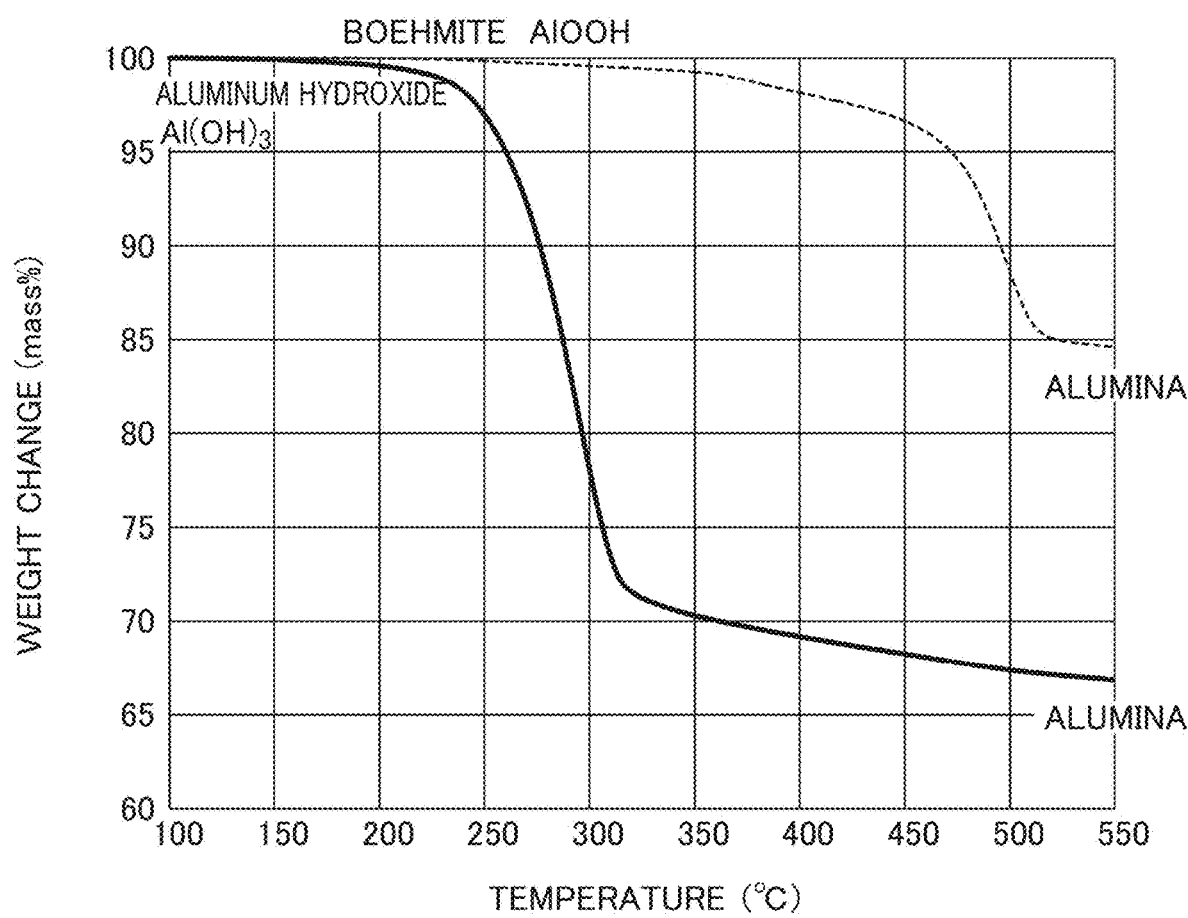
FIG. 22 illustrates TG curves of boehmite and aluminum hydroxide.

FIG. 22 illustrates TG curves of boehmite and aluminum hydroxide. As illustrated in FIG. 22, when boehmite or aluminum hydroxide is heated, weight loss is observed because a hydroxyl group desorbs due to dehydration condensation to form alumina. From this result, in the case of an inorganic substance having a hydroxyl group, such as boehmite or aluminum hydroxide, when the solid powder thereof is heated to, for example, 1000° C. or higher as in the sintering method, alumina is produced. Thus, it is considered that the hydroxyl group of the present example is not detected in such a sintered body.

The entire contents of Japanese Patent Application No. 2020-125102 (filed on Jul. 22, 2020) are incorporated herein by reference.

Although the present embodiment has been described above, it is not limited to these descriptions, and various modifications can be made within the scope of the gist according to the present embodiment.

INDUSTRIAL APPLICABILITY

The present disclosure is capable of providing a composite member in which an inorganic layer and a resin layer are firmly joined together with no adhesive interposed therebetween.

REFERENCE SIGNS LIST

1 Composite member
10 inorganic layer
20 Resin layer
21 Resin
22 Inorganic particles

The invention claimed is:

1. A composite member, comprising:
an inorganic layer that includes an inorganic substance comprising a metal oxide hydroxide; and
a resin layer that is provided on a surface of the inorganic layer and includes a resin and inorganic particles that are dispersed in the resin and a plurality of the inorganic particles adhere directly to the inorganic substance of the inorganic layer, wherein
a porosity in a cross section of the inorganic layer is 20% or less, and
a peak derived from a hydroxyl group is detected for the inorganic layer when measurement is performed using infrared spectroscopy or X-ray diffraction.

2. The composite member according to claim 1, wherein the porosity in the cross section of the inorganic layer is 10% or less.

3. The composite member according to claim 1, wherein the inorganic particles have a hydroxyl group.

4. The composite member according to claim 1, wherein some of the inorganic particles and the inorganic substance contained in the inorganic layer are continuously bound to each other.

5. The composite member according to claim 1, wherein the inorganic particles comprise a metallic element contained in the inorganic substance of the inorganic layer.

6. The composite member according to claim 1, wherein the resin layer contains 10 vol % or more and 70 vol % or less of the inorganic particles.

7. The composite member according to claim 1, wherein the inorganic substance contained in the inorganic layer is polycrystalline.

* * * * *